(12) United States Patent
Klode

(10) Patent No.: US 6,703,740 B2
(45) Date of Patent: Mar. 9, 2004

(54) BRUSHLESS MOTOR WITH REDUCED ROTOR INERTIA

(75) Inventor: Harald Klode, Centerville, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/736,910

(22) Filed: Dec. 14, 2000

(65) Prior Publication Data

US 2002/0074895 A1 Jun. 20, 2002

Related U.S. Application Data

(60) Provisional application No. 60/170,559, filed on Dec. 14, 1999.

(51) Int. Cl.[7] .............................................. H02K 21/12
(52) U.S. Cl. ..................... 310/114; 310/156.08; 310/216
(58) Field of Search ........................ 310/112, 113, 310/114, 261, 264, 265, 266, 156.81; 29/596–598

(56) References Cited

U.S. PATENT DOCUMENTS

| | | | |
|---|---|---|---|
| 2,492,678 A | * 12/1949 | Amtsberg | 310/114 |
| 2,974,242 A | 3/1961 | Apstein | |
| 3,484,635 A | * 12/1969 | MacKallor | 310/114 |
| 3,680,671 A | * 8/1972 | Hendershot et al. | 310/216 |
| 3,683,249 A | * 8/1972 | Shibata | 318/730 |
| 4,473,752 A | * 9/1984 | Cronin | 290/38 R |
| 4,562,367 A | 12/1985 | Kumatani | |
| 4,674,178 A | 6/1987 | Patel | |
| 4,745,318 A | * 5/1988 | Ivanics | 310/114 |
| 5,041,749 A | * 8/1991 | Gaser et al. | 310/156 |
| 5,744,895 A | * 4/1998 | Seguchi et al. | 310/266 |
| 5,783,890 A | 7/1998 | Mulgrave | |
| 5,804,896 A | * 9/1998 | Takehara et al. | 310/156 |
| 6,121,705 A | * 9/2000 | Hoong | 310/113 |
| 6,265,801 B1 | * 7/2001 | Hashiba et al. | 310/214 |

FOREIGN PATENT DOCUMENTS

| | | | | |
|---|---|---|---|---|
| JP | 58-116032 | * | 7/1983 | 310/216 |
| JP | 01203884 | | 8/1989 | |

OTHER PUBLICATIONS

Search note 00988053.5–2207 –US 0033767 of Dec. 2, 2002.

* cited by examiner

*Primary Examiner*—Tran Nguyen
(74) *Attorney, Agent, or Firm*—Scott A. McBain

(57) ABSTRACT

A direct current electric motor having a reduced inertia rotor includes a stator affixed to a housing wherein the stator comprises a plurality of electrically conductive windings. The stator further defines a central cavity in which is mounted a rotor. The rotor comprises a shaft, at least two magnets affixed in a radially spaced manner from the shaft, and a rotor core between the shaft and magnets that is rotationally de-coupled from the shaft and the magnets.

5 Claims, 2 Drawing Sheets

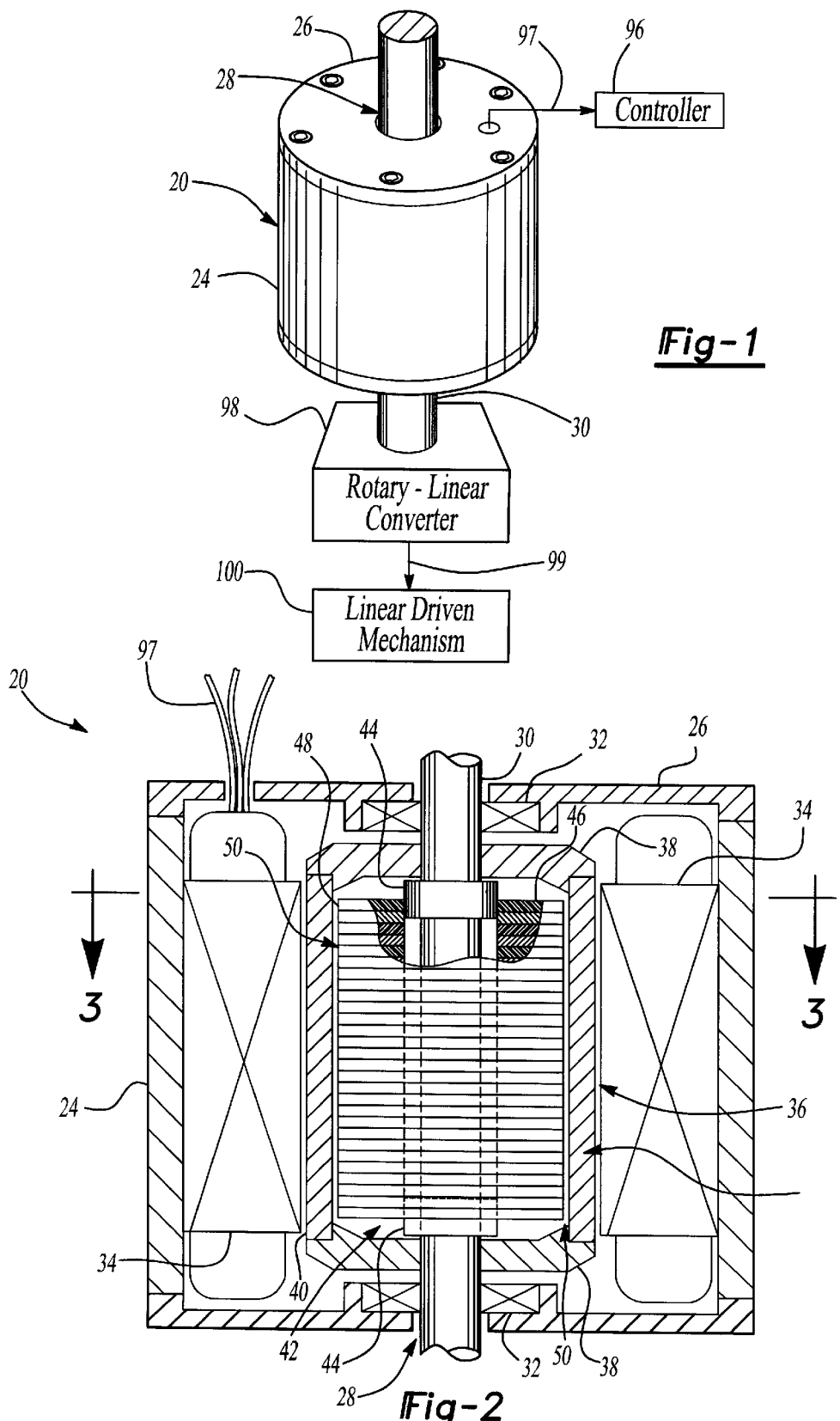

BRUSHLESS MOTOR WITH REDUCED ROTOR INERTIA

CLAIM OF PRIORITY

This application claims priority under 35 USC §119(e) from provisional application serial No. 60/170,559 filed on Dec. 14, 1999, entitled "Actuators for Use with Electric Disc Brake Calipers".

TECHNICAL FIELD

The present invention relates to direct current electric motors and in particular to rotors for direct current electric motors.

BACKGROUND OF THE INVENTION

Mechanical linkage and hydraulic pressure operated controls for vehicles are well known in the art, and generally comprise control input devices operated by a user such as steering wheels, shift levers, and foot pedals which are directly interlinked with various vehicle controls individually or by combinations of mechanical push rods, gears, cables, or hydraulic pressure lines. Such controls have been utilized in vehicles such as automobiles and trucks since the inception and initial manufacture of such vehicles. As technology has advanced, today's vehicles regularly incorporate computers in various forms to assist in vehicle control. These computers can rapidly acquire various objective input data, analyze the data, and adjust the vehicle controls based on the data analysis to more readily optimize the operation of various vehicle systems and controls. As a result of the rapid computational power of the computers the computers can issue control commands at a much faster rate than older technology mechanical system configurations can respond. The requirement for increased control response times were initially felt in the aerospace industry where modern aircraft have evolved from the use of mechanically linked controls to electrically operated controls in a concept commonly known as "fly-by-wire".

Other industries such as the auto industry are now also in need of such rapid response capability in the control systems of such vehicles. One such system desired to be adaptable to electrically operated controls on many automobiles requiring rapid control response are anti-lock brake systems ("ABS"). The concept of an ABS on vehicles is to permit the user to apply a constant pressure to the brake pedal which the braking system senses whether or not the wheels are in a skid to provide maximum braking force to the wheels while the wheels are turning and to release the braking force when a skid is sensed. Such cycling between different braking states occurs rapidly to minimize the braking distance of the vehicle while preventing the vehicle wheels from locking in a skid. To provide the desired and optimum actuation of this type of system requires new modes of system actuation other than prior art mechanical means. Electric servos and DC electric motors with improved response times readily lend themselves to integration with the onboard computers and vehicle systems.

Some controls such as those used with the above-mentioned ABS require rapid cycling of the servos or motors wherein the desired cycling times are in the range of milliseconds. The cycling rates of these control motors are a function of a number of factors, one of which is motor size. Larger motors generally require more time in which to cycle since the moving parts of the motor are generally of a greater mass and correspondingly have a larger inertia which must be overcome to either start or to reverse direction. Because of the torque and power requirements to provide sufficient control forces such as those required on vehicle brakes, current motor designs while a significant improvement over mechanical linkage, still do not optimally lend themselves to applications wherein there is also a requirement for rapid cycling of the control motor.

Prior art motor designs typically include a stator comprising a series of electrical windings to generate magnetic fields that in turn induce the rotation of a rotor. The rotor is generally of a relatively high mass wherein the rotors generally comprise a shaft upon which is mounted a high-density magnetic core with a plurality of permanent magnets affixed about its periphery. The large mass of the rotor results in a large rotational inertia, which is then difficult to reverse or cycle at the desired high cycling rates. Thus, there is a need for a DC electric motor that is capable of delivering greater torque with reduced rotational inertia to facilitate rapid control cycling.

SUMMARY OF THE INVENTION

One aspect of the present invention is a direct current electric motor including a housing with a stator that further includes a plurality of electrically conductive windings. The stator defines a central cavity in which a rotor is rotatably mounted therein. The rotor comprises a shaft and at least two magnets affixed in a radially spaced manner from the shaft and includes a rotor core between the shaft and the magnets wherein the rotor core is rotationally de-coupled from the shaft and the magnets.

Another aspect of the present invention is a rotor for a DC motor. The rotor includes a shaft and a plurality of magnets rotationally coupled to the shaft and radially spaced there from the shaft and the magnets define a cannular cavity therebetween in which is positioned a rotor core. The rotor core is rotationally de-coupled from the shaft and the magnets.

Yet another aspect of the present invention is a direct current electric motor capable of rapid reversal rates. The motor includes a housing and a stator affixed within the housing wherein the stator defines a substantially cylindrical cavity having a central axis. A rotor is journaled to the housing for rotation about the central axis and is positioned within the cylindrical cavity. The rotor includes a shaft having an axis of rotation coincident with the central axis and a plurality of magnets radially spaced from the shaft and rotationally affixed thereto. The shaft and the plurality of magnets define a cannular cavity within which a rotor core is positioned and is rotationally de-coupled from the shaft and the magnets.

Still another aspect of the present invention is a method for minimizing the rotational inertia of an electric motor rotor. The method comprises the steps of providing a rotor shaft; mounting a plurality of magnets about the shaft in a rotationally coupled manner; and mounting a rotor core about the shaft and within the magnets in a rotationally de-coupled manner.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a perspective view of a direct current electric motor embodying the present invention and integrated into a generic control mechanism.

FIG. 2 is a longitudinal sectional view of a DC electric motor incorporating a reduced inertia rotor.

DESCRIPTION OF THE PREFERRED EMBODIMENT

Figure 3:
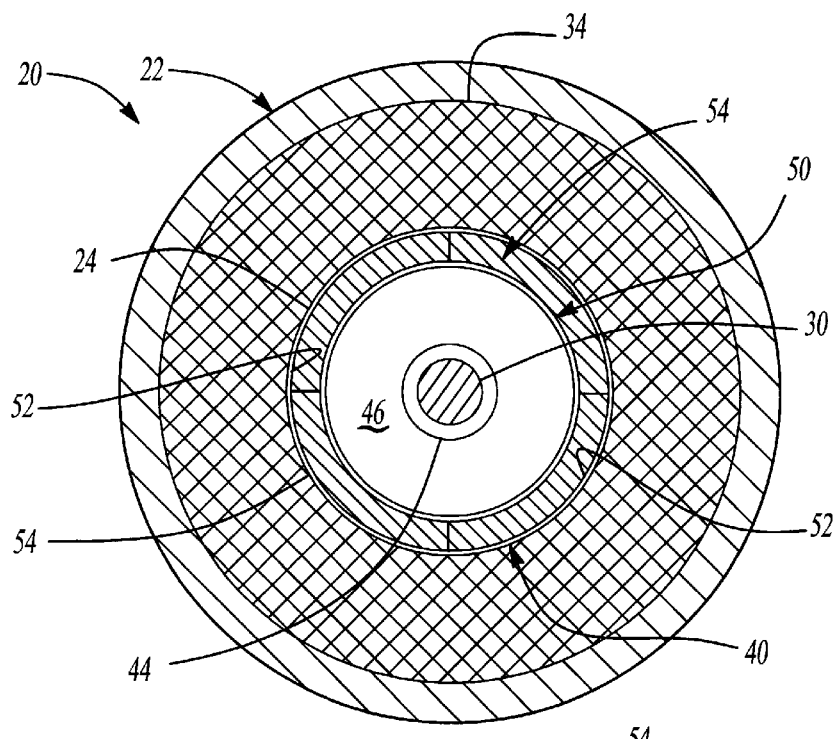
FIG. 3 is a plan sectional view of the DC electric motor of FIG. 2 taken along the line III—III of FIG. 2.

For purposes of description herein, the terms "upper", "lower", "right", "left", "rear", "front", "vertical", "horizontal", and derivatives thereof shall relate to the invention as oriented in FIG. 2. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a DC electric motor 20, which is one of the preferred embodiments of the present invention incorporated into a vehicle control system.

Direct current electric motor 20 is connected via an interface 97 typically comprised of electrically conductive wires for transmitting electrical signals and electric power to the motor 20 from a controller 96. Controller 96 can be a computer processor or similar controller that issues start, stop, and directional commands to motor 20. The output of motor 20 generally takes the form of rotational torque transmitted by rotating shaft 30 which delivers its rotational torque to rotary-linear converter 98. Converter 98 converts the rotational torque of shaft 30 to a linear force. Such converters are well known in the art and include, but are not limited to, combinations of planetary gears, rack and pinion mechanisms, etc. The linear force output of rotary-linear converter 98 is transmitted via linear drive linkage 99 to a linear driven mechanism 100. As an example, linear driven mechanism can be a disc brake caliper for a vehicle brake. Those skilled in the art will recognize that different combinations and applications of rotary-linear converters and linear driven mechanisms are possible and contemplated within the disclosures described herein.

Referring now to FIG. 2, electric motor 20 is shown in longitudinal cross-section to illustrate the internal components and the arrangement thereof. Direct current electric motor 20 includes a housing 22, which is typically comprised of a cylindrical body 24 and end plates 26 at each end thereof. Each end plate 26 has a centrally located aperture 28 to permit a driveshaft 30 to extend therethrough to deliver the power output of motor 20 to rotary-linear converter 98 as previously discussed with respect to FIG. 1. Driveshaft 30 is freely rotatable with respect to housing 22 and is mounted in apertures 28 by shaft support bearings 32. Shaft support bearings 32 can be any one of known bearing constructions incorporating ball bearings, roller bearings, magnetic bearings or other low friction combinations to permit shaft 30 to freely rotate within housing 22.

A stator 34 comprising windings of a plurality of electrical conductors is affixed to the inside periphery of housing 22. Stator 34 is of a construction that is well known within the direct current electric motor art, and thus its construction and assembly although not described in detail herein will be readily understood by those skilled in the art. The control signals from controller 96 are generally transmitted to stator 34 by interface wiring 97. Stator 34 defines a substantially cylindrical cavity within electric motor 20.

A rotor assembly 36 is positioned within the cylindrical cavity defined by stator 34. Rotor assembly 36 includes driveshaft 30, which extends along the central longitudinal axis of motor 20 and is rotationally journaled therein as previously described. A permanent magnet ring 40 comprising a plurality of permanent magnets 52 and 54 are mounted about the periphery of driveshaft 30 and radially spaced therefrom by end caps 38. The outer diameter of the plurality of permanent magnets 40 is slightly smaller than the diameter of the cylindrical cavity defined by stator 34 thereby insuring that rotor assembly 36 can freely rotate within the central cavity defined by stator 34. Driveshaft 30, end caps 38 and permanent magnet ring 40 define a cannular cavity that houses rotor core assembly 42. Rotor core assembly 42 is mounted on shaft 30 by bearings 44 such that rotor core assembly 42 can freely rotate about shaft 30 and is substantially rotationally de-coupled therefrom. Rotor core bearings 44 can again be a bearing configuration including ball bearings, roller bearings, magnetic bearings or any other commonly known bearing configurations minimizing the frictional interface between rotor core 46 and driveshaft 30. The diameter of rotor core 46 is minimally smaller than the inside diameter of the permanent magnet ring 40 radially spaced from driveshaft 30, thus defining an air gap 50 between rotor core 46 and permanent magnet ring 40. Rotor core 46 comprises a solid mass or alternatively a plurality of wafer-like laminates 48 which are bonded together to form the cylindrical rotor core 46. The solid core mass or each wafer-like laminate 48 is fabricated from an electrically conductive and magnetically permeable material such as steel. However, each laminate 48 is coated with a non-conductive coating such that each laminate 48 is electrically insulated from its next most adjacent laminate.

FIG. 3 illustrates a cross-section of DC electric motor 20 illustrating the generally concentric arrangement of its various elements wherein cylindrical body 24 of housing 22 is the outermost element. Stator 34 is attached to the internal periphery of cylindrical body 24 and extends about the entire internal periphery. Permanent magnet ring 40 of rotor assembly 36 is comprised of a plurality of permanent magnets 52 and 54 arranged such that magnet polarity of adjacent magnets are different here illustrated with four permanent magnets wherein north poles 52 are separated by permanent magnet south poles 54. While any number of permanent magnets can comprise permanent magnet ring 40, only four such magnets are illustrated herein for the sake of clarity and simplicity. Rotor core 46 is sized and positioned within permanent magnet ring 40 in such a manner to minimize air gap 50 therebetween. At the center is rotor core bearing 44 mounting rotor core 46 to shaft 30 in a rotationally de-coupled manner.

Figure 4:
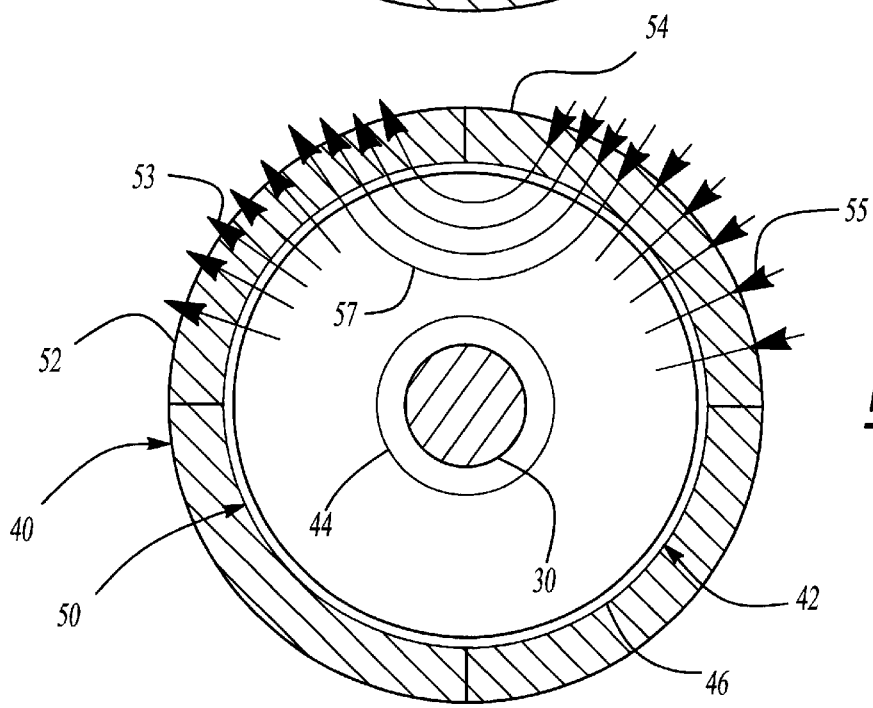
FIG. 4 is an enlargement of the cross-sectional view of FIG. 3 showing the rotor and further illustrating magnetic flux lines.

Those skilled in the art will recognize from FIG. 4 that the alternating polarity of magnets 52 and 54 have magnetic flux lines schematically presented as outwardly pointing arrows 53 representing north pole flux lines and inwardly pointing arrows 55 representing south pole flux lines with the magnetic flux present in rotor core 46 schematically illustrated by flux lines 57.

In operation, as a directional start control signal is received by motor 20 on interface wiring 97, the windings of stator 34 are energized in a manner known in the art to induce the desired directional rotation of rotor assembly 36 to deliver a desired torque to rotary-linear converter 98. Because of the generally short linear actuation distances required by linear driven mechanism 100, same-directional rotation of motor 20 occurs only for a very short time. For example, motor 20 is designed to operate at a rotational speed of approximately 5,000 rpm and since only approximately 20 revolutions of rotor assembly 36 are required to produce the desired linear travel of mechanism 100, motor 20 need operate in a single direction for only milliseconds at a time. Since rotor core 46 is rotationally de-coupled from shaft 30 by bearings 44 and with the short directional cycle time of motor 20, rotor core 46 remains substantially stationary within motor 20. Thus, only the mass of shaft 30, end caps 38, and permanent magnet ring 40 need be accelerated to its operational rotational speed.

With the decreased mass induced into rotation by stator 34, rotor assembly 36, with a smaller rotational inertia, is accelerated at a faster rate. Correspondingly, rotor assembly 36 can be cycled in an opposite direction in a reduced cycle time from that of a standard rotor where the entire rotor assembly, including the rotor core, must be accelerated, decelerated and then changed direction to be accelerated in the opposite direction.

Thus, those skilled in the art will readily recognize that by decoupling the rotor core from the rotor shaft electric motor 20 exhibits a vastly improved control cycle time in applications such as those required by, for example, anti-lock braking systems, or other similar applications. The function of the rotor core is to provide a path for the magnetic flux associated with permanent magnet ring 40, and this function does not require the concurrent rotation of rotor core 46 with permanent magnet ring 40. While optimally permanent magnet ring would be bonded to core 46 for maximum electrical performance, the air gap 50 between core 46 and permanent magnet ring 40 results in some minor adverse performance degradation. The degradation is minimized by minimizing the air gap between rotor core 46 and permanent magnet ring 40. The minimal degradation caused by air gap 50 is greatly offset by the reduced rotational inertia when rotor core 46 is rotationally de-coupled from shaft 30.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principals of patent law, including the doctrine of equivalents.

What is claimed is:

1. A direct current electric motor having a reduced inertia rotor, said motor comprising:

a housing;

a stator affixed to said housing, said stator comprising a plurality of electrically conductive windings and further defining a central cavity; and a rotor shaft;

a pair of spaced end caps secured to said shaft, a plurality of magnets mounted between said end caps, in radially spaced relationship to said shaft, said magnets extending circumferentially about said shaft with opposite poles of adjacent magnets extending parallel to said shaft and abutting one another, and a rotor core rotatably supported by said shaft in radially spaced relationship to said magnets for rotation relative to said magnets.

2. The direct current electric motor according to claim 1 wherein said at least one end cap comprises a non-magnetic material.

3. The direct current electric motor according to claim 1 wherein said rotor core comprises a single mass (6) and each laminate includes an electrically non-conductive coating thereby electrically insulating each of said plurality of laminates from a next most adjacent laminate.

4. A direct current electric motor having a reduced inertia rotor, said motor comprising:

a housing;

a stator affixed to said housing, said stator comprising a plurality of electrically conductive windings and further defining a central cavity; and a rotor mounted within said central cavity and rotatable therein, said rotor comprising a shaft, at least two magnets affixed in a radially spaced manner therefrom, wherein said at least two magnets are alternative in polarities and abutting to one another and a rotor core therebetween and rotationally de-coupled from said shaft and said magnets and comprising a plurality of stacked wafer-like laminates with each laminate including an electrically non-conductive coating whereby electrically insulating ends of said laminates from a next most adjacent laminate.

5. The direct current electric motor according to claim 4 wherein said at least one end cap comprises a non-magnetic material.

* * * * *